Feb. 23, 1965   J. J. ABRAMSON   3,170,819
ELECTRIC BATTERY
Filed Sept. 5, 1961   2 Sheets-Sheet 1

INVENTOR.
JAY J. ABRAMSON

United States Patent Office 3,170,819
Patented Feb. 23, 1965

3,170,819
ELECTRIC BATTERY
Jay J. Abramson, Euclid, Ohio, assignor to The Electric Storage Battery Company, a corporation of New Jersey
Filed Sept. 5, 1961, Ser. No. 135,815
6 Claims. (Cl. 136—6)

The present invention generally relates to electric storage batteries. More particularly, the present invention is concerned with multicell storage batteries of the type having containers sealed to prevent the passage of gases.

It is one object of the present invention to provide a new and improved means for facilitating the recombination of gases, evolved during the operation of a multicell battery, with the electrochemically active material of the electrodes in order that systems of the type described may be operated in the sealed condition.

It is known in the prior art that under certain conditions batteries can be operated in a sealed container without an undue build-up of gas pressure within the container by properly proportioning the electrochemical capacities of the electrodes with respect to each other and by operating the cell with a limited amount of electrolyte, the latter being contained substantially within the pores of an absorbent separator and within the pores of the electrodes themselves. The theory of operation of a sealed cell with limited amount of electrolyte is that by limiting the amount of electrolyte to that necessary for ion transfer between the electrodes and to that amount necessary to provide a thin film covering the electrode pore walls, to maintain them highly electrochemically active, the effective surface of the electrodes is more readily available for direct combination with the gases liberated during cell operation. In this manner, there is maintained within the cell a balanced system which provides for gas recombination at a rate which prevents an undue build-up of gas pressure within the cell.

Inasmuch as the recombination of hydrogen with the active material of the electrodes, is more difficult to achieve than the recombination of oxygen, it is customary to proportion the active materials between the positive and negative electrodes to provide for the preferential evolution of oxygen. The preferred method of proportioning the active materials is that disclosed in the copending application of W. W. Smith et al., Serial No. 637,510, filed January 31, 1957, and assigned to the assignee of the present invention which is now U.S. Patent No. 3,057,942. In that application there is described a method for insuring the preferential evolution of oxygen by providing an excess of charged positive active material over the amount of charged negative active material and an excess of reserve uncharged negative active material. In this manner the positive electrodes limit on charge producing oxygen on overcharge prior to any evolution of hydrogen from the negative electrodes which enables the charged negative active material to react with the oxygen produced, thus preventing hydrogen evolution and an undue build-up of pressure within the cell. The negative electrodes limit on discharge with the charged negative active material becoming completely exhausted prior to the complete utilization of the charged positive active material, assuring oxygen evolution on overdischarge or reversal.

As will be understood by those skilled in the art it is extremely difficult in the production of batteries to prevent variations in the effective capacities of the cells which make up a battery. In addition, although cells may be produced having initial uniform capacities, inequalities in capacity may develop among the cells of a battery through unequal electrical treatment or unequal deterioration. As battery discharge continues, unequal cell capacities can result in the reversal or overdischarge of the weak cells by the cells of higher capacity which have not been exhausted. Under such conditions, oxygen can be evolved within the reversed cell or cells at a rate which could cause an undue build-up of pressure within such cells.

It has been herebefore proposed to minimize cell reversal by incorporating antipolar masses which act as a mechanism for delaying this occurrence. A weak cell however, could still undergo a dangerous pressure build-up if a sufficient amount of antipolar mass was not present. Another problem with prior art batteries comprising individual sealed cells is that there is no mechanism available to build the capacity of a weak cell on recharge which has been overdischarged but did not cause an undue build-up of pressure because of an antipolar mass. Only the oxygen evolved in the cell can be returned to the negative electrodes and hence, the negative active material can never build up capacity and the cell will remain weak and subject to reversal on battery discharge. Constant reversal has proven to be detrimental to the cycle life characteristics of a weak cell.

In accordance with the present invention, a sealed multicell battery is built without an antipolar mass, but incorporating an manifolding arrangement such that all cells are exposed to a common gas space. In these cells the active material is proportioned in accordance with the teachings of the aforementioned copending application, Serial No. 637,510. In this construction when a weak cell is reversed, the oxygen produced is distributed among all the cells of the battery, this oxygen combines with the negative active material of the stronger cells which is not yet polarized promoting its discharge. This action results in the maintenance of low pressure throughout the battery until all the cells thereof are completely discharged. Unlike prior art battery constructions wherein the individual cells are sealed and the oxygen evolved in a weak cell is returned to the weak cell on recharge, in a battery made in accordance with the present invention, all of the oxygen evolved is distributed among all of the cells, thus providing a build-up of negative capacity in the weak cell on recharge. This tends to equalize the state of charge of the cells of the battery improving its performance. Where the individual cells of a battery are sealed, weak cells remain weak since no equalization of the cell capacity is possible. The teachings of the present invention are applicable to both sealed acid and alkaline systems.

A better understanding of the present invention may be had from the following description when read with reference to the accompanying drawings of which:

Figure 1:
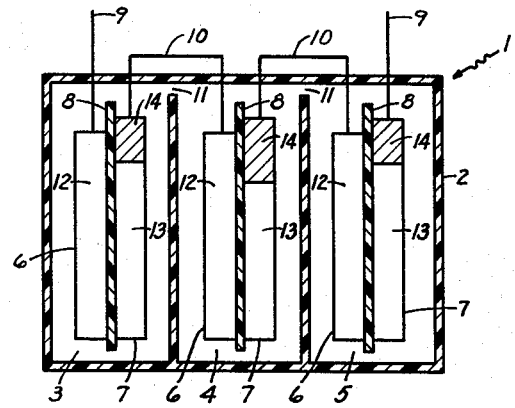
FIG. 1 is a schematic sectional view of a battery in accordance with the present invention at the start of discharge.

Referring now to FIG. 1, the numeral 1 generally designates a sealed multicell battery in accordance with the teachings of the present invention having sealed container 2 comprising a plurality of cell compartments 3, 4, and 5. Each of the cell compartments 3, 4, and 5 house a cell of the battery 1 which is schematically shown as comprising a positive electrode 6 and a negative electrode 7 spaced by a microporous separator 8. As will be understood by those skilled in the art, the cells of the battery 1 may comprise a plurality of positive and negative electrodes connected in the conventional manner. Each of the cells of the battery 1 are connected in series to the battery terminals 9 as indicated by the reference numeral 10. As shown, each of the cell compartments 3, 4, and 5 are not individually sealed, but are inter-connected by means of the openings 11 which provide in effect a manifolding arrangement whereby the cells are exposed to a common gas space.

The battery 1 has cells having electrode capacities proportioned in accordance with the teachings of the aforementioned copending application, Serial No. 637,510. The cell in FIG. 1 is shown at the start of discharge and the relative proportioning of charged and uncharged active material in the electrode is indicated schematically in accordance with electrode size. Thus, the positive electrodes 6 have an excess charged positive active material 12 over the amount of charged negative active material 13 in the negative electrodes 7. In addition, each of the negative electrodes 7 has an excess of uncharged negative active material 14. For purposes of illustration, the cells of the battery 1 are shown in an unequal state of charge with the negative electrode of cell 4 having less charged negative active material than cells 3 and 5.

Figure 2:
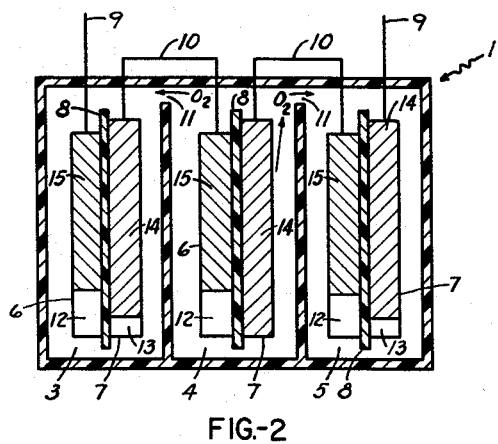
FIG. 2 is a schematic sectional view of the battery of FIG. 1 after discharge has progressed to the point that a weak cell is reversed.

Referring now to FIG. 2, the cell of FIG. 1 is shown after discharge has progressed to the point at which the charged negative active material 13 in the cell 4 has been depleted and that cell by virtue of the ability of cells 3 and 5 to provide further discharge has gone into reversal evolving oxygen at its negative electrode. In this figure, the numeral 15 designates discharged positive active material. As shown schematically, the oxygen evolved at the negative electrode 7 of the reversed cell 4 passes, by means of the intercell openings 11, to cells 3 and 5 where it can react with the charged negative active material 13 in those cells, hastening the discharge of these stronger cells. This action results in the maintenance of a low pressure throughout the battery until all the cells thereof are discharged.

Unlike the prior art types of sealed battery construction wherein the individual cells are sealed and wherein the same amount of oxygen is returned to weak negative electrodes when recharged, in the battery of the present invention oxygen evolved during overdischarge is distributed to the stronger negative electrodes of the strong cells leaving an improved build-up of negative active material when the battery is recharged. This equalization is shown schematically in FIG. 3 which illustrates a battery in accordance with the present invention after it has been recharged. The distribution of oxygen throughout the entire battery as opposed to the individual cell tends to equalize the condition of all the cells of the battery on recharge, wherein batteries in which the individual cells are sealed, the weak cells will remain weak, since no equalization is possible. As will be understood by those skilled in the art, the amount of capacity equilization achieved will depend upon the depth of the battery discharge.

In order to demonstrate the operability of batteries built in accordance with the present invention, several 4-cell, 6-volt sealed batteries were built in accordance with the teachings of the copending application of P. Ruetschi and J. B. Ockerman, Serial No. 34,234, filed June 6, 1960, and assigned to the assignee of the present invention. In this application there is described a sealed acid type battery having lead peroxide positive electrodes and metallic antimony negative electrodes. The electrolyte for this battery is sulfuric acid which has been immobilized in the electrode assembly, which comprises at least one positive electrode, negative electrode and separator therebetween; and which by reaction with the negative electrode provides in the assembly an excess of sulfate ions beyond that available from the amount of liquid electrolyte absorbed within the electrode assembly. The lead antimony couple provides cell potential of 1½ volts. The test cells were constructed with a common gas volume for all cells and had active materials proportioned between the positive and negative electrodes in the manner described hereinbefore. Each of the cells had four negative electrodes and three positive electrodes interleaved with microporous polyethylene separators. Both the negative and positive electrodes were 2¹³⁄₁₆" high, 3⁹⁄₃₂" wide, and 0.07" thick. The positive electrodes comprised conventional lead alloy grids pasted with lead oxide and were electroformed to lead peroxide and the negative electrodes utilized similar grids pasted with antimony oxide and were electroformed to metallic antimony.

Figure 3:
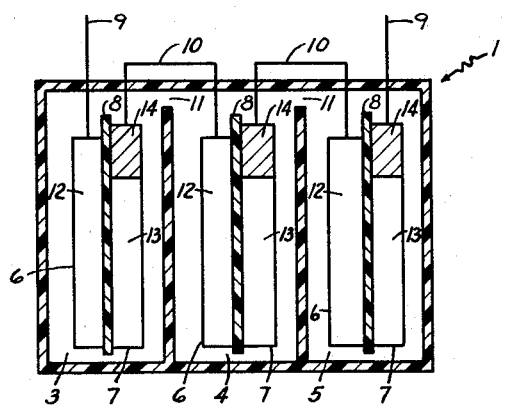
FIG. 3 is a schematic sectional view of the battery of FIG. 1 after recharging, showing the equalization of cell capacity achieved according to the present invention.
Figure 4:
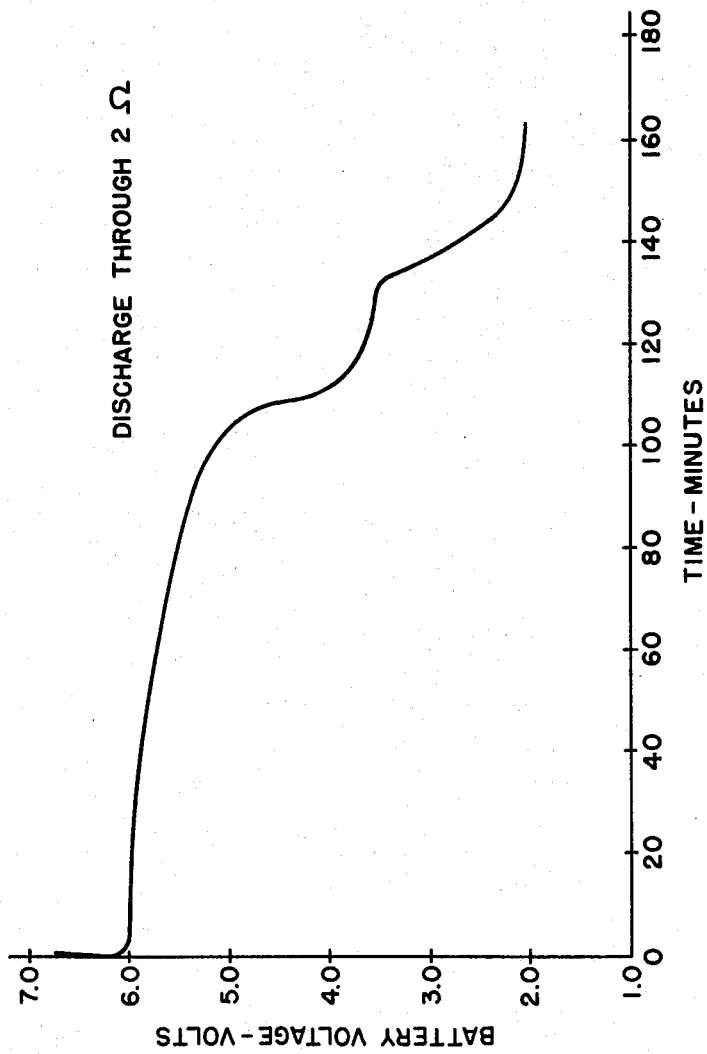
FIG. 4 shows a discharge curve for a multicell battery constructed in accordance with the teachings of the present invention.

FIG. 3 shows a typical discharge curve for the test cells where the discharge was through a 2-ohm resistor. As shown, for the first 100 minutes of the discharge the voltage of these batteries remained between 6.0 and 5.15 volts. This period was followed by a sharp drop in the battery terminal voltage to a second plateau between 3.6 and 3.4 volts followed by a second sharp dip to a third plateau at 2.0 volts. The fact that there exists three distinct plateaus in the discharge curve to 2.0 volts indicates that the knee of each plateau represents a cell reversal. After the first plateau the pressure rise within the test cells was moderate, at no time exceeding 4.0" of mercury even when the terminal voltage of the battery was at 2.0 volts. The latter portion of the discharge represents 60 minutes where one and possibly two cells of the test batteries were operating in reverse at an average rate of 1.25 amperes. This reduced cell pressure can be contrasted to the pressure build-up experienced in single cells of the type described which were discharged into a state of reversal at 2 amperes. In these reversed single test cells slight gassing was noted when the cell voltage reached 1.20 volts and increased rapidly as the cell voltage dropped to −0.75 volt. In a period of about 60 minutes with a cell voltage between 1.20 volts and −0.75 volt the pressure within the test cells reached 12" of mercury at which time the discharge was discontinued.

At the conclusion of the discharge of the 4-cell test batteries, their terminal voltages rose to 6.0 volts within minutes and the internal pressure within the batteries reduced to −4.0" of mercury within a very short time. These batteries were recharged at a rate of 0.55 ampere for a total of 14.3 ampere hours with an end charge voltage of 7.40 volts with a pressure build-up of only 2.0" of mercury.

In considering the present invention it should be understood that while the tests described above were carried out utilizing sealed lead-antimony batteries, which are acid type batteries, that the teachings of the present invention are equally applicable to mutlicell sealed batteries of the alkaline type. In particular, it is applicable to sealed nickel-cadmium battery systems and tests indicate that in such systems the teachings of the present invention function not only to maintain safe pressure levels within the battery containers on cell reversal, but provides for a capacity equalization among battery cells.

Having described the invention, that which is claimed as new is:

1. A sealed, multicell storage battery having a plurality of cells electrically connected in series comprising a plurality of cell compartments within a sealed battery container, each of said cell compartments housing an electrode assembly having a positive electrode, a negative electrode and a separator therebetween, said positive electrode having an excess of charged positive active material over the amount of charged negative active material and said negative electrode having an excess of reserve uncharged negative active material which provides for the preferential evolution of oxygen upon overcharge and overdischarge, with electrolyte being contained substantially within the pores of the electrode assembly in each cell compartment, and gas passage means interconnecting the cell compartments to provide a gas space common to all of the electrode assemblies within the sealed battery container whereby oxygen evolved in one cell compartment may pass into another cell compartment and be combined with active material in said other cell compartment.

2. A sealed, multicell storage battery in accordance with claim 1 which is an alkaline storage battery.

3. A sealed, multicell storage battery in accordance with claim 2 in which the positive electrodes contain nickel active material and the negative electrodes contain cadmium active material.

4. A sealed, multicell storage battery in accordance with claim 1 which is an acid type storage battery.

5. A sealed, multicell storage battery in accordance with claim 4 in which the positive electrodes contain lead peroxide active material and the negative electrodes contain antimony active material.

6. A sealed, multicell storage battery having a plurality of cells electrically connected in series comprising a plurality of cell compartments within a sealed battery container, each of said cell compartments housing an electrode assembly comprising at least a positive electrode and a negative electrode spaced from said positive electrode by means of a separator, with electrolyte being contained substantially within the pores of the electrode assembly in each cell compartment, the charged and uncharged capacity of the active materials of said electrodes being proportioned in such a manner that oxygen is preferentially evolved on overcharge and overdischarge, and gas passage means interconnecting the cell compartments to provide a gas space common to all of the cell elements within the sealed battery container whereby oxygen evolved in one cell compartment may pass into another cell compartment and be combined with active material in said other cell compartment.

References Cited in the file of this patent

UNITED STATES PATENTS

| | | |
|---|---|---|
| 2,571,927 | Neumann et al. | Oct. 16, 1951 |
| 2,727,079 | Chubb et al. | Dec. 13, 1955 |
| 2,803,690 | Stevens | Aug. 20, 1957 |
| 2,951,106 | Ruetschi | Aug. 30, 1960 |
| 3,031,517 | Peters | Apr. 24, 1962 |
| 3,057,942 | Smith et al. | Oct. 9, 1962 |

FOREIGN PATENTS

| | | |
|---|---|---|
| 165,102 | Great Britain | Apr. 27, 1922 |

OTHER REFERENCES

Schult et al.: Electro-Technology, vol. 68, July 1961, pages 87–91.